(12) United States Patent
Klinghult et al.

(10) Patent No.: US 7,379,720 B2
(45) Date of Patent: May 27, 2008

(54) KEYPAD LIGHTING USING POLYMER LIGHT EMITTING DEVICES

(75) Inventors: Gunnar Klinghult, Lund (SE); Mats Larsson, Lund (SE)

(73) Assignee: Sony Ericsson Mobile Communications AB (SE)

( * ) Notice: Subject to any disclaimer, the term of this patent is extended or adjusted under 35 U.S.C. 154(b) by 584 days.

(21) Appl. No.: 10/370,399

(22) Filed: Feb. 20, 2003

(65) Prior Publication Data

US 2004/0176048 A1 Sep. 9, 2004

(51) Int. Cl.
*H04B 1/18* (2006.01)

(52) U.S. Cl. ............... 455/157.2; 455/158.5; 455/159.1; 455/566; 200/341; 200/344

(58) Field of Classification Search ............ 455/157.2, 455/158.5, 159.1, 566
See application file for complete search history.

(56) References Cited

U.S. PATENT DOCUMENTS

| | | | | |
|---|---|---|---|---|
| 4,046,981 A | * | 9/1977 | Johnson et al. | 200/516 |
| 5,043,716 A | * | 8/1991 | Latz et al. | 345/82 |
| 5,265,274 A | * | 11/1993 | Knutson et al. | 455/347 |
| 5,708,428 A | * | 1/1998 | Phillips | 341/22 |
| 5,757,139 A | | 5/1998 | Forrest et al. | |
| 5,834,893 A | | 11/1998 | Bulovic et al. | |
| 5,917,280 A | | 6/1999 | Burrows et al. | |
| 5,931,764 A | * | 8/1999 | Freeman et al. | 482/4 |
| 5,971,557 A | * | 10/1999 | Kubes et al. | 362/24 |
| 5,977,514 A | * | 11/1999 | Feng et al. | 219/121.69 |
| 5,998,045 A | | 12/1999 | Chen et al. | |
| 6,005,496 A | * | 12/1999 | Hargreaves et al. | 341/22 |
| 6,006,118 A | | 12/1999 | Stephenson | |
| 6,017,644 A | | 1/2000 | Toshida et al. | |
| 6,026,283 A | | 2/2000 | Stephenson | |
| 6,150,187 A | | 11/2000 | Zyung et al. | |
| 6,199,996 B1 | | 3/2001 | Katrinecz, Jr. et al. | |
| 6,284,435 B1 | | 9/2001 | Cao | |
| 6,313,261 B1 | | 11/2001 | Samuel et al. | |
| 6,368,732 B1 | | 4/2002 | Jin et al. | |
| 6,403,236 B1 | | 6/2002 | Ohnishi et al. | |
| 6,444,334 B1 | | 9/2002 | Doi et al. | |

(Continued)

FOREIGN PATENT DOCUMENTS

EP 1 152 443 A2 11/2001

(Continued)

OTHER PUBLICATIONS

Definition of "polymer LED", http://whatis.techtarget.com/definition/0..sid9_gci535060.00.html, last updated Sep. 3, 2001.

(Continued)

*Primary Examiner*—Matthew Anderson
*Assistant Examiner*—Minh Dao
(74) *Attorney, Agent, or Firm*—Myers Bigel Sibley & Sajovec, P.A.

(57) ABSTRACT

At least one key of a keypad of an electronic device, such as a wireless terminal, includes a polymer light emitting device, also referred to as a polymer LED, thereon. A polymer LED may be on the inner and/or outer surface of the face of the key and may be unpatterned and/or patterned to form a symbol.

48 Claims, 7 Drawing Sheets

U.S. PATENT DOCUMENTS

| | | | |
|---|---|---|---|
| 6,465,953 B1* | 10/2002 | Duggal | 313/553 |
| 6,661,029 B1* | 12/2003 | Duggal | 257/89 |
| 6,686,549 B2* | 2/2004 | Douzono et al. | 200/341 |
| 6,704,004 B1* | 3/2004 | Osterg.ang.rd et al. | 345/170 |
| 6,956,561 B2* | 10/2005 | Han | 345/170 |
| 7,074,099 B2* | 7/2006 | Sundahl et al. | 445/6 |
| 2003/0234767 A1* | 12/2003 | Kanaya | 345/168 |
| 2004/0066374 A1* | 4/2004 | Holloway et al. | 345/168 |
| 2004/0109666 A1* | 6/2004 | Kim | 385/147 |

FOREIGN PATENT DOCUMENTS

| | | |
|---|---|---|
| EP | 1 398 808 A1 | 3/2004 |
| WO | WO 02/15210 A1 | 2/2002 |
| WO | WO 02/097837 A1 | 12/2002 |

OTHER PUBLICATIONS

Notification of Transmittal of the International Search Report and The Written Opinion of the International Searching Authority, or the Declaration, International Search Report, and Written Opinion of the International Searching Authority, PCT/EP2004/000378, Jul. 28, 2004.

EPO Standard Search Report, File No. RS 109484, Aug. 18, 2003.

IteK Works SPRL, "Citation of Prior Art", Apr. 18, 2006.

Email from Examiner Minh Dao to Mitchell S. Bigel dated Feb. 3, 2006, with subject line "FW: Citation of Prior Art §2202—U.S. Appl. No. 10/370399".

* cited by examiner

KEYPAD LIGHTING USING POLYMER LIGHT EMITTING DEVICES

FIELD OF THE INVENTION

This invention relates to electronic devices such as wireless terminals, and more particularly to keypads for electronic devices such as wireless terminals.

BACKGROUND OF THE INVENTION

Electronic devices such as wireless terminals often include a keypad for user inputs. As is well known to those having skill in the art, an electronic device typically includes a housing, a plurality of electronic components in the housing and a keypad at least partially in the housing. The keypad includes at least one key.

For example, a wireless terminal generally includes a keypad having a set of number keys (0-9), a * key and a # key, and one or more function keys, such as SEND, END and → keys. As used herein, the term "wireless terminal" encompasses a wide variety of portable or fixed wireless devices that can access a wireless communications system. Wireless terminals include a cellular radiotelephone with a multi-line display, a Personal Communications System (PCS) terminal that may combine a cellular radiotelephone with data processing, facsimile and/or data communications capabilities, a Personal Digital Assistant (PDA) that can include a radiotelephone, pager, Internet/intranet access, Web browser, organizer, calendar and/or a Global Positioning System (GPS) receiver, and conventional laptop, palmtop and/or pervasive computing devices that include wireless receivers.

Electronic devices often are used in poorly lit or dark environments, so that it may be desirable to illuminate the keypads thereof. Moreover, even if the keypad is not illuminated, it may be desirable to illuminate an individual key upon actuation thereof to provide visible feedback. Keypad illumination may present technical challenges for wireless terminals due to the desirability of decreasing the size and decreasing the power consumption of the wireless terminal, while at the same time providing bright, evenly distributed illumination.

It is generally known to illuminate a keypad using Light Emitting Diodes (LEDs) and a lightguide. Some keypad illumination schemes use LEDs to send light into a lightguide that is made of transparent material. The lightguide guides the light until it meets surfaces that are designed to reflect light up through the keys. Other techniques using a lightguide that is made of dispersing (translucent) material, wherein the light is scattered all around and some portion of the light is transmitted out of the lightguide through the keys. Wireless terminals with lightguides are described, for example, in U.S. Pat. No. 6,006,118 to Stephenson, entitled Keypad Lightguides Including Compartments, and U.S. Pat. No. 6,026,283 to Stephenson, entitled Electrically Conductive Keypad Lightguides.

Unfortunately, lightguides may have low optical efficiency due to the desire to make the lightguide thin and/or the desire to provide holes and/or other deformations therein to accommodate other components of the wireless terminal. Moreover, since LEDs may send out light in many directions, efficient optical coupling to the lightguide may be difficult. It also may be difficult to obtain evenly distributed light, so that about the same luminescence may be obtained from all the keys. In order to obtain evenly distributed light, many LEDs may be used, which may increase power consumption and/or cost. Moreover, light may leak from the gap between the keys and the housing.

SUMMARY OF THE INVENTION

Wireless terminals according to some embodiments of the present invention include a housing, a plurality of electronic components in the housing that are configured to transmit and/or receive wireless communications, a keypad at least partially in the housing that comprises at least one key, and a polymer light emitting device on the at least one key. As is well known to those having skill in the art, a polymer light emitting device, also referred to as a polymer LED, a light emitting polymer or a polyLED, uses a polymer as the semiconductor material for a light emitting device. Polymers are chemical substances that include large molecules that are, themselves, made from many smaller and simpler molecules.

In other embodiments of the invention, the at least one key comprises a face including an outer surface that is configured for user activation and an inner surface opposite the outer surface. The polymer light emitting device is on the inner and/or outer surface. In some embodiments, the polymer light emitting device is an unpatterned polymer light emitting device and/or is patterned to form a symbol. In some embodiments, when an unpatterned light emitting device is used, at least one of the outer surface and the inner surface is patterned to form a symbol by providing an opening therein and/or a patterned layer thereon, which forms the symbol. Moreover, a coating may be provided on the polymer light emitting device opposite the outer surface in some embodiments.

In yet other embodiments, the at least one key includes at least one wall that extends from the inner surface to within the housing, and the wireless terminal further comprises first and second electrodes that are electrically connected to the polymer light emitting device and extend along the at least one wall. Moreover, in other embodiments, the at least one key includes a nonplanar face, and the polymer light emitting device is conformal to the nonplanar face. Finally, in still other embodiments, the polymer light emitting device on a first key is configured to emit light of the first color, and the polymer light emitting device on the second key is configured to emit light of a second color that is different from the first color. In yet other embodiments, different colors may be used for different portions of a single key.

The above description has focused on the use of a polymer light emitting device on at least one key of a wireless terminal due to the difficulties that may have been encountered heretofore in providing satisfactory keypad illumination for wireless terminals. However, it will be understood by those having skill in the art that other embodiments of the invention may provide other electronic devices that include a housing, a plurality of electronic components in the housing, a keypad at least partially in the housing that includes at least one key, and a polymer light emitting device on the at least one key. These electronic devices may include handheld video games and/or other portable or nonportable terminals without wireless capabilities. In these embodiments, the polymer light emitting device may be provided on at least one key, according to any of the embodiments that were described above. Other embodiments of the invention provide a keypad and/or key for an electronic device that includes a polymer light emitting device that is configured according to any of the embodiments that were described above. Still other embodiments of the present invention may be used with user input devices other than a key, such as a jog dial, joystick, jog ball, coin key or the like, wherein the user input device includes a face including an outer surface that is configured for user activation, an inner surface opposite the outer surface and a polymer light emitting device on at least one of the inner surface and the outer surface.

Finally, it also will be understood that, as used herein, the term "comprising" or "comprises" is open-ended, and includes one or more stated elements, steps and/or functions without precluding one or more unstated elements, steps and/or functions.

DETAILED DESCRIPTION OF PREFERRED EMBODIMENTS

Figure 1:
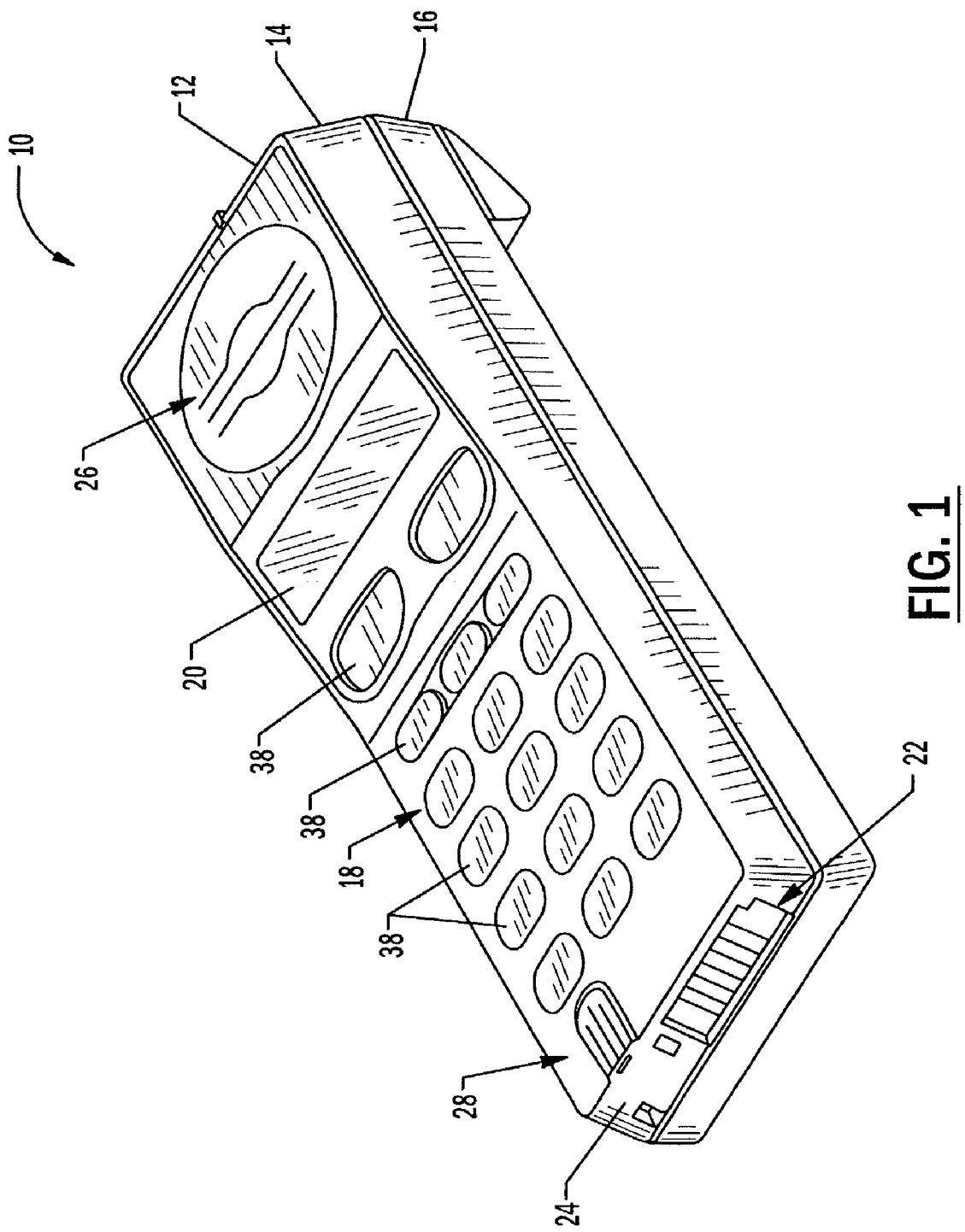
FIG. 1 is a perspective view of wireless terminals according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It also will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Embodiments of the present invention use a polymer light emitting device on at least one key of a keypad of an electronic device such as a wireless terminal. As described, for example, in the online dictionary whatis.com, a polymer light emitting device, also referred to as light-emitting polymer or polyLED, is a technology based on the use of polymer as the semiconductor material in LEDs. Dow Chemical Corporation announced the discovery of light-emitting polymers at the spring meeting of the Materials Research Society in 1998. Polymers are chemical substances that consist of large molecules that are, themselves, made from many smaller and simpler molecules: proteins and DNA are examples of naturally occurring polymers; many others, such as nylon, are artificially created. Because of their flexibility and strength, polymers are used for products such as car bumpers and bulletproof vests.

As also described in this dictionary, because polymers are lightweight and flexible, they can be simply and inexpensively used for the creation of thin film displays for future technologies such as the electronic newspaper. Polymer LEDs have a number of inherent qualities that are ideally suited to such applications: they enable full-spectrum color displays, high brightness at low drive voltages, glare-free viewing, and long operating lifetimes. It is currently possible to create a small text display by structuring the polymer material and electrodes. The technology also offers a great deal of promise as a basis for cheaper, simpler lighting sources. According to Edmund Woo, of Dow's Materials Research and Development Laboratory, polymer LEDs could be used to create a brightness similar to that of fluorescent lighting on a 5-volt power supply. See the definition of "polymer LED" on whatis.techtarget.com/definition/0,,sid9_gci535060,00.html, last updated on Sep. 3, 2001.

Polymer light emitting devices are well known to those having skill in the art and are described, for example, in U.S. Pat. No. 5,757,139 to Forrest et al. entitled Driving Circuit for Stacked Organic Light Emitting Devices; U.S. Pat. No. 5,834,893 to Bulovic et al. entitled High Efficiency Organic Light Emitting Devices With Light Directing Structures; U.S. Pat. No. 5,917,280 to Burrows et al. entitled Stacked Organic Light Emitting Devices; U.S. Pat. No. 5,998,045 to Chen et al. entitled Polymeric Light-Emitting Device; U.S. Pat. No. 6,017,644 to Toshida et al. entitled Organic Compound, Its Polymer and Light Emitting Device; U.S. Pat. No. 6,150,187 to Zyung et al. entitled Encapsulation Method of a Polymer or Organic Light Emitting Device; U.S. Pat. No. 6,284,435 to Cao entitled Electrically Active Polymer Compositions and Their Use in Efficient, Low Operating Voltage, Polymer Light-Emitting Diodes with Air-Stable Cathodes; U.S. Pat. No. 6,313,261 to Samuel et al. entitled Polymer Light Emitting Diode; U.S. Pat. No. 6,368,732 to Jin et al. entitled Light-Emitting Polymers Having High Efficiency and Color Tunable Properties; U.S. Pat. No. 6,403,236 to Ohnishi et al. entitled Polymer Light Emitting Device; and U.S. Pat. No. 6,444,334 to Doi et al. entitled Polymeric Fluorescent Substance and Polymer Light-Emitting Device Using the Same.

Referring now to FIG. 1, an electronic device such as a wireless terminal 10 is configured to include at least one key having a polymer light emitting device thereon according to embodiments of the present invention. More specifically, the wireless terminal 10 includes a housing 12 having a front portion 14 and a back portion 16. The front and back housing portions 14 and 16 enclose electronic components that are configured to transmit and/or receive wireless communications. An external and/or internal antenna also may be provided. A keypad 18 including at least one key 38 having a polymer light emitting device thereon, is also provided at least partially in the housing 12. A display window 20 also is provided to facilitate radiotelephone operation. Electrical connectors 22 on a bottom portion 24 of the housing 12 are configured to connect with external electrical connectors, to facilitate hands-free operation of the wireless terminal, recharging of batteries within the wireless terminal, or the like. Slots 26 are provided at one end of the wireless terminal 10 to allow a user to hear audio communications via a speaker enclosed within the housing 12. Slots 28 are provided at an opposite end of the wireless terminal 10, to allow the user to speak into a microphone enclosed within the housing 12. It will be understood that many other configurations of wireless terminals 10 can include a polymer light emitting device on at least one key, according to embodiments of the present invention. Moreover, many other electronic devices may be provided according to embodiments of the present invention, which include a housing, a plurality of electronic components in the housing, and a keypad at least partially in the housing that comprises at least one key and a polymer light emitting device on the at least one key.

Figure 2:
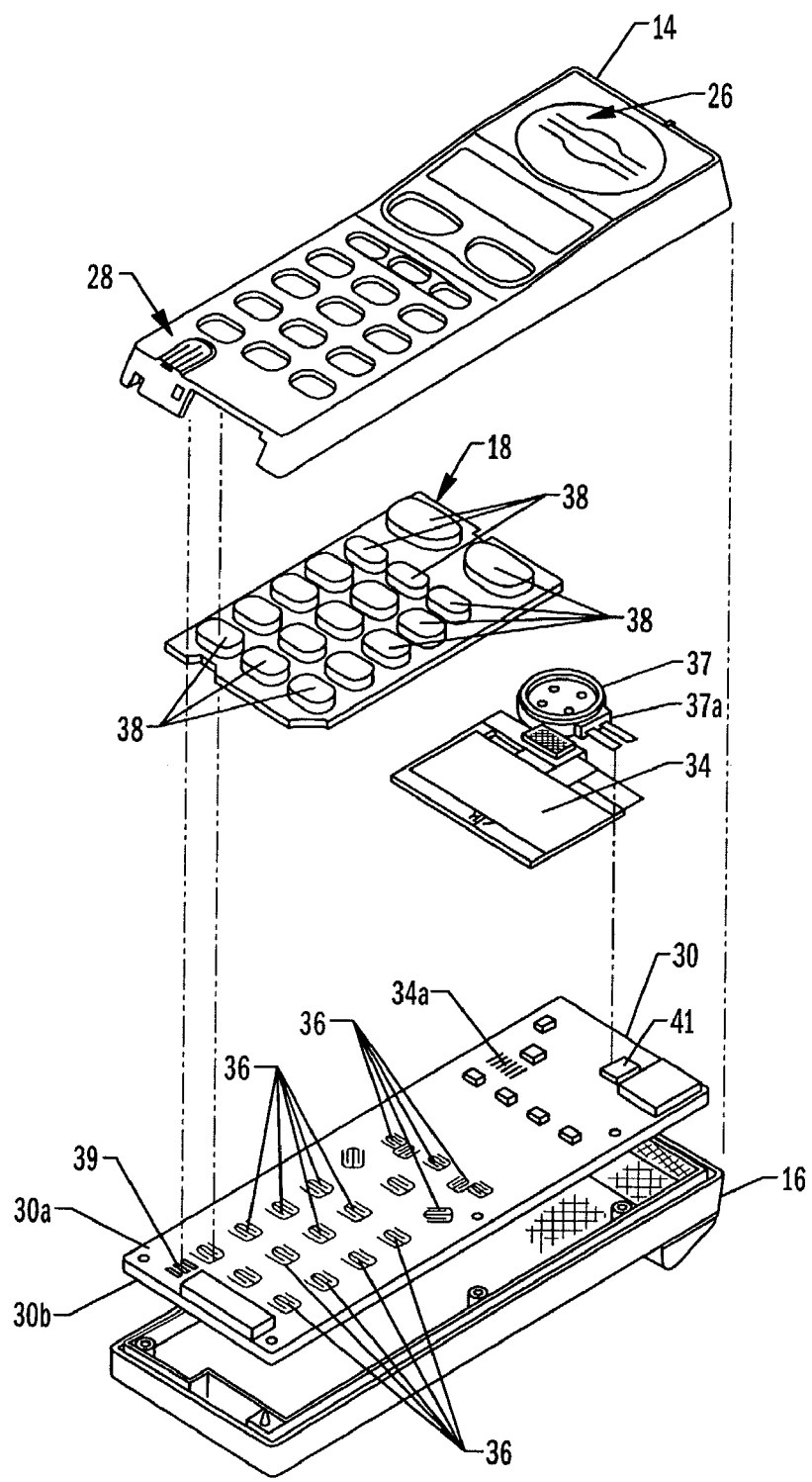
FIG. 2 is an exploded perspective view of a circuit board and keypad that is configured to be contained within a housing of a wireless terminal illustrated in FIG. 1.

Referring now to FIG. 2, an exploded perspective view is provided of internal components contained within the housing 12 of the wireless terminal 10. The illustrated components include a circuit board 30 and a keypad 18. As is known to those having skill in the art, various electronic components that enable the wireless terminal 10 to transmit and/or receive wireless signals are mounted on the circuit board 30. The circuit board 30 includes opposing first and second faces 30a, 30b. Most electronic components are attached to the circuit board second face 30b, because contact pads 36 are located on the circuit board first face 30a. The contact pads 36 are positioned so that a respective contact pad is positioned beneath the respective key 38 of the overlying keyboard 18. A Liquid Crystal Display (LCD) 34 also is included, and is viewable through the display window 20 of the front housing portion 14 when the wireless terminal 10 is assembled. LCD 34 makes electrical contact with the circuit board 30 via electrical contacts 34a, as illustrated. A speaker 37 is configured to align with the slots 26 in the front housing portion 14 when the wireless terminal 10 is assembled. A microphone 39 is also attached to the circuit board as illustrated, and is configured to align approximately with the slots 28 in the front housing portion 14 when the illustrated wireless terminal is assembled. When the wireless terminal 10 is assembled, an electrical contact 37a on the speaker 37 makes contact with an electrical contact 41 on the circuit board, to establish electrical communication therebetween.

Still referring to FIG. 2, the keypad 18 includes a plurality of keys 38 arranged for user operation. At least one of, and, in some embodiments, each, illustrated key 38 includes a polymer light emitting device thereon. In embodiments shown in FIG. 2, the keys 38 protrude through the front housing 14 for user access. Each key 38 is positioned to be operably engageable with a respective contact pad 36 on the circuit board first face 30a. When the user presses a key 38, the key makes contact with a respective contact pad 36. In other embodiments, other activation and/or contact mechanisms may be used. It will also be understood by those having skill in the art that the keys 38 need not be movable but, rather, may be stationary and activated by contact. Also, the polymer light emitting device on the key may be rigidly and/or fixedly coupled thereto. Moreover, various shapes and sizes of keys 38 may be provided. Finally, the polymer light emitting device may be positioned at one or more locations on the key according to various embodiments of the present invention that will be described in detail below.

Figure 3A:
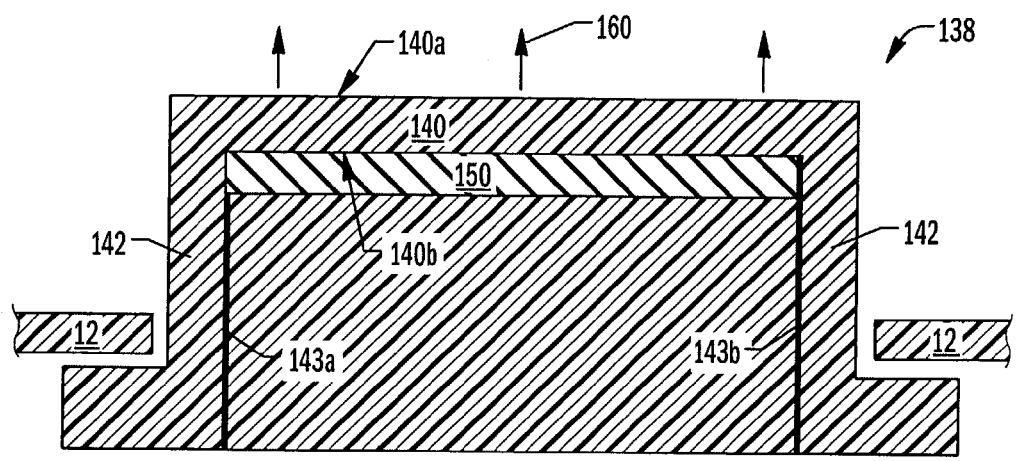
FIGS. 3A-7B are cross-sectional views of keys according to various embodiments of the present invention.
Figure 3B:
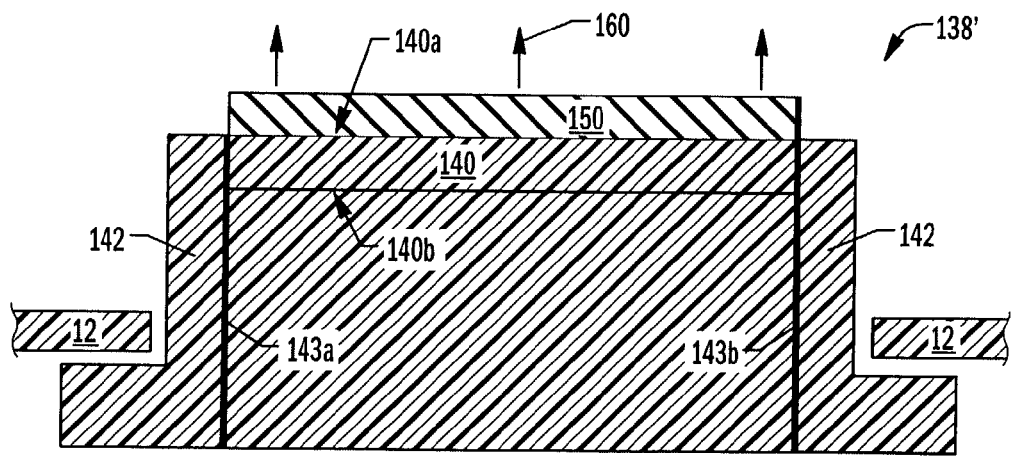

FIGS. 3A and 3B are cross-sectional views of keys including polymer light emitting devices thereon according to some embodiments of the present invention. As shown in FIG. 3A, key 138, which may correspond to a key 38 of FIGS. 1 and 2, includes a face 140 having an outer surface 140a that is configured for user activation and an inner surface 140b opposite the outer surface. In FIG. 3A, the polymer light emitting device 150 is on the inner surface 140b, opposite the outer surface 140a. In contrast, FIG. 3B illustrates a key 138' wherein the polymer light emitting device 150 is on the outer surface 140a, opposite the inner surface 140b. In either case, light 160 is emitted by the polymer light emitting device 150, away from the housing 12. Light also may be emitted towards the housing 12.

In both FIGS. 3A and 3B, the key 138, 138', respectively, also includes at least one wall 142 that extends from the inner surface 140b to within the housing 12. As also shown in FIGS. 3A and 3B, first and second electrodes 143a, 143b are electrically connected to the polymer light emitting device 150 and extend along the at least one wall 142. The first and second electrodes 143a, 143b may extend along inner and/or outer surfaces of the wall 142 and/or may extend within the wall 142. The electrodes 143a, 143b may comprise, for example, conductive polymer. Selective contact may be made to the circuit board by spring loaded metal fingers that are soldered on the circuit board and that selectively contact the conductive polymer on the key, by contacting the conductive polymer with gold plated pads on the circuit board by pressing the key against the printed circuit board, by using a flexible film from the conductive polymer on the keypad that is connected to the circuit board and/or by other conventional connection techniques. It also will be understood that multiple polymer light emitting devices 150 may be used on both the inner and/or outer surfaces 140a and 140b of the face 140 in other embodiments.

Figure 4A:
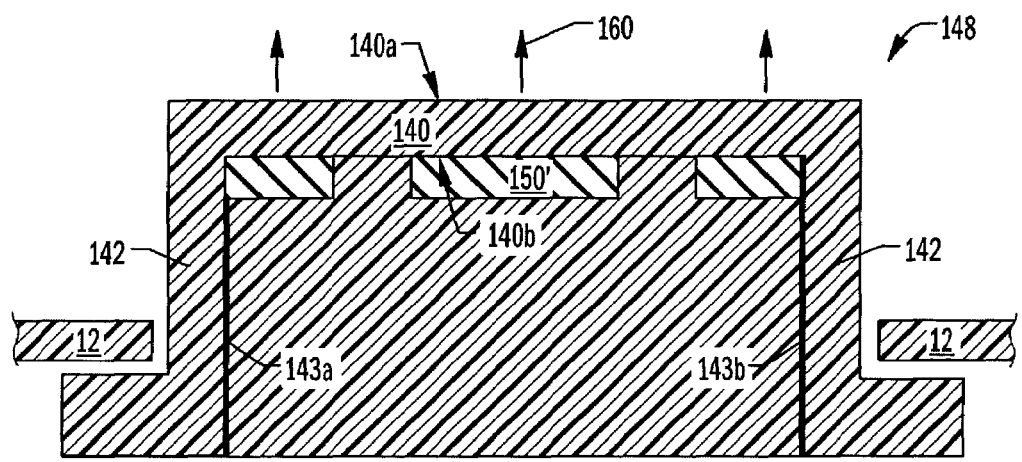
Figure 4B:
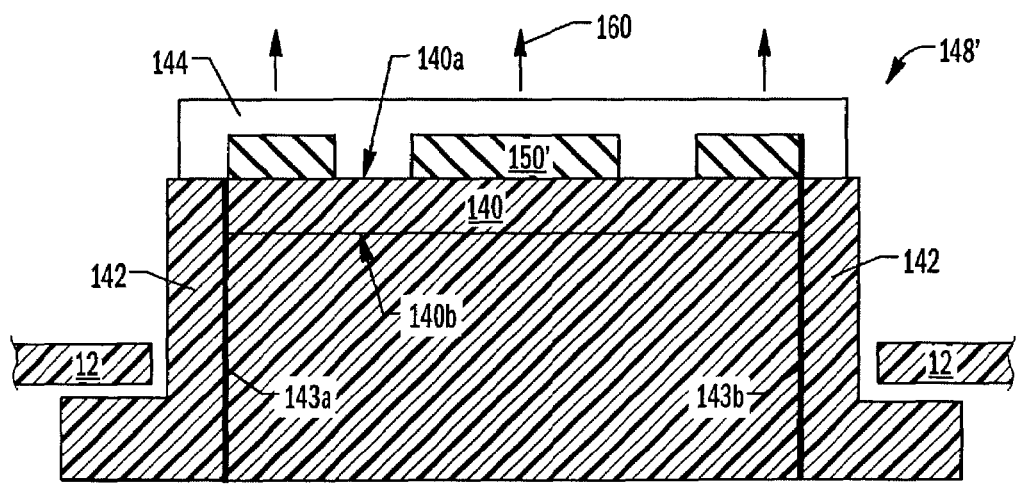

In embodiments of FIGS. 3A and 3B, the polymer light emitting device 150 is unpatterned to provide uniform light output. In sharp contrast, in FIGS. 4A and 4B, the polymer light emitting device 150' on keys 148 and 148', respectively, is patterned to form a symbol, such as a number, letter and/or other symbol. Accordingly, a "neon light" type of illumination may be provided. It also will be understood that the polymer light emitting device 150' may be patterned so that the symbol is defined by the un-illuminated portions of the key rather than the illuminated portions. As also shown in FIG. 4B, a protective coating 144 may be placed on the polymer light emitting device 150' opposite the face 140. In some embodiments, the coating 144 may comprise one or more transparent or nearly transparent materials such as plastic and/or silicone rubber. This coating also may be used in embodiments of FIGS. 2A-2B or 3B. The coating may be uniform and/or patterned.

Figure 5A:
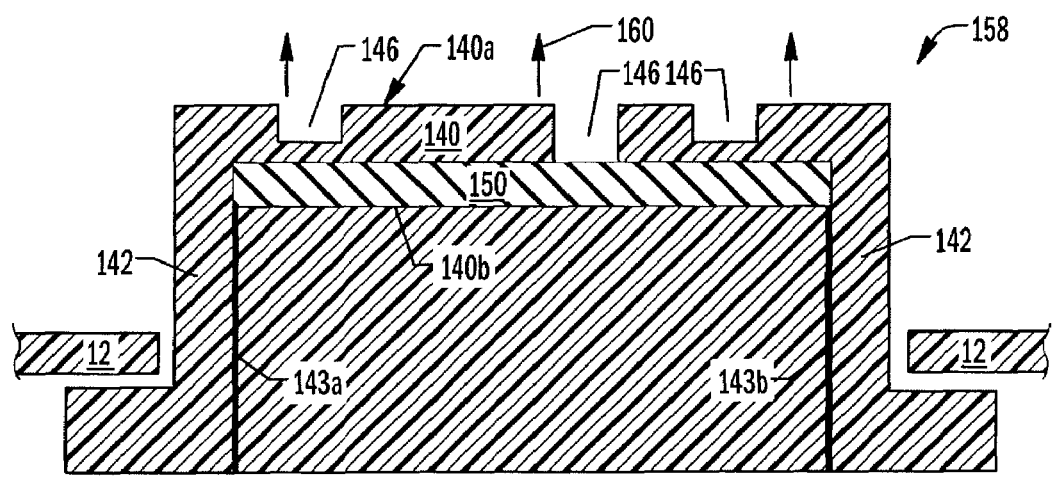
Figure 5B:
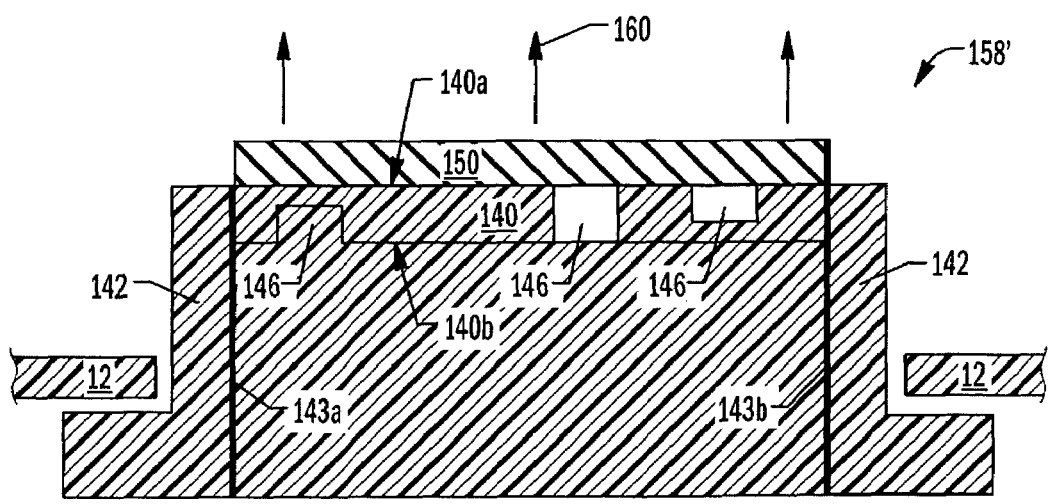
Figure 6A:
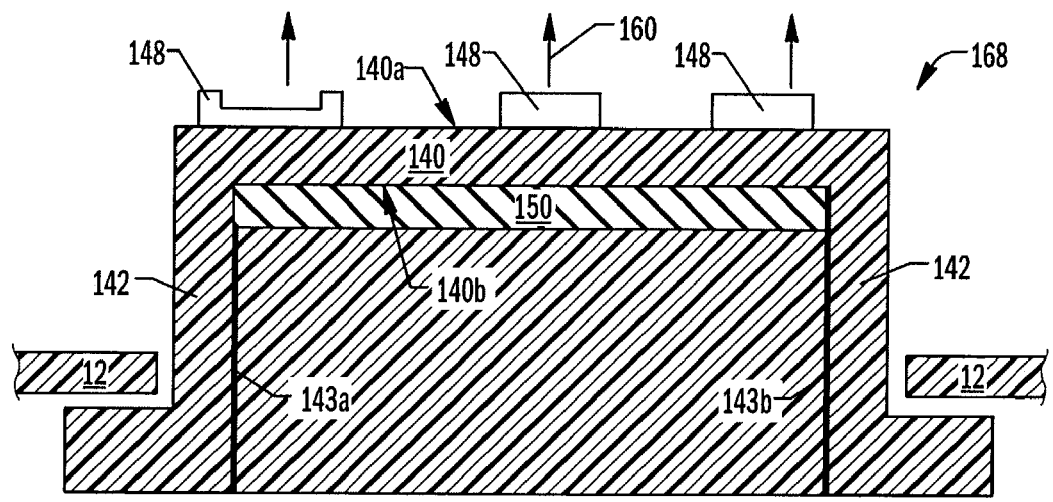
Figure 6B:
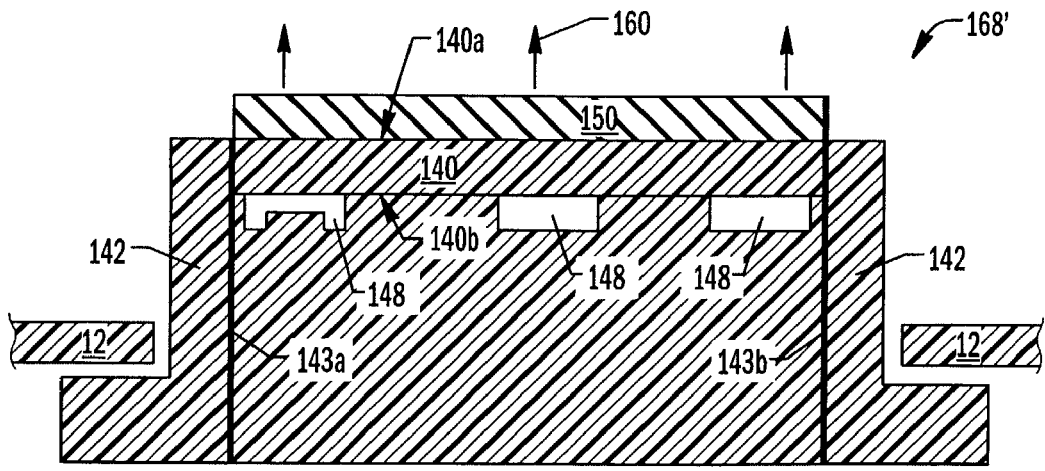

Referring now to FIGS. 5A and 5B, other embodiments of keys 158 and 158', respectively, may define symbols by patterning at least one of the outer surface 140a and the inner surface 140b. Thus, as shown in FIG. 5A, one or more openings 146 may be formed in the outer surface 140a and/or the inner surface 140b of the face 140. These openings may extend only partly through and/or entirely through the face 140. These openings 146 may remain unfilled and/or may be filled with a transparent, translucent and/or opaque material, to form a symbol. It also will be understood that a patterned face 140 may be used with any of the embodiments of FIGS. 3A-3B and 4A-4B. Moreover, as shown in FIGS. 6A and 6B, respectively, symbols may be formed by patterning a layer 148 that is separate from the polymer light emitting device 150 and/or the face 140 of the respective key 168 and 168'. It also will be understood that embodiments of FIGS. 6A and 6B may be used in combination with embodiments of FIGS. 3A-5B.

Figure 7A:
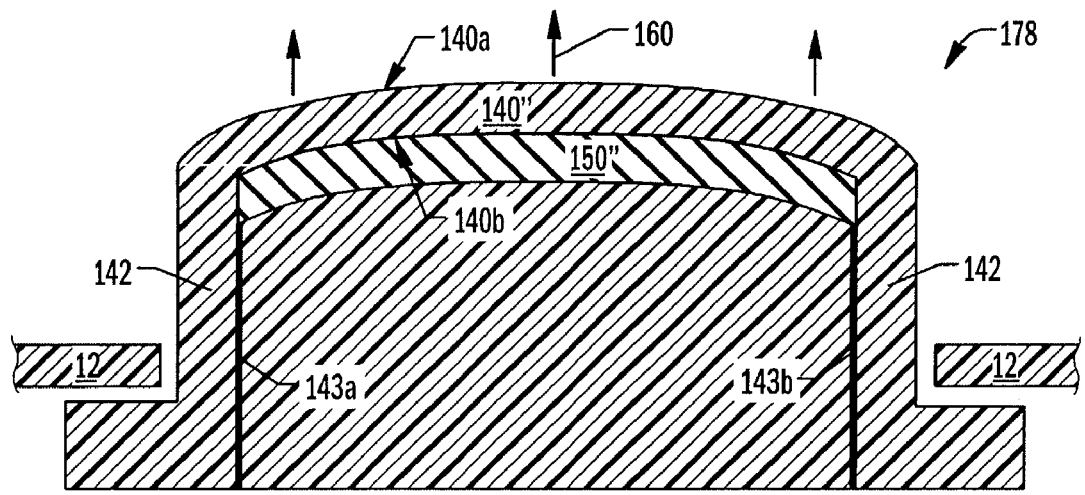
Figure 7B:
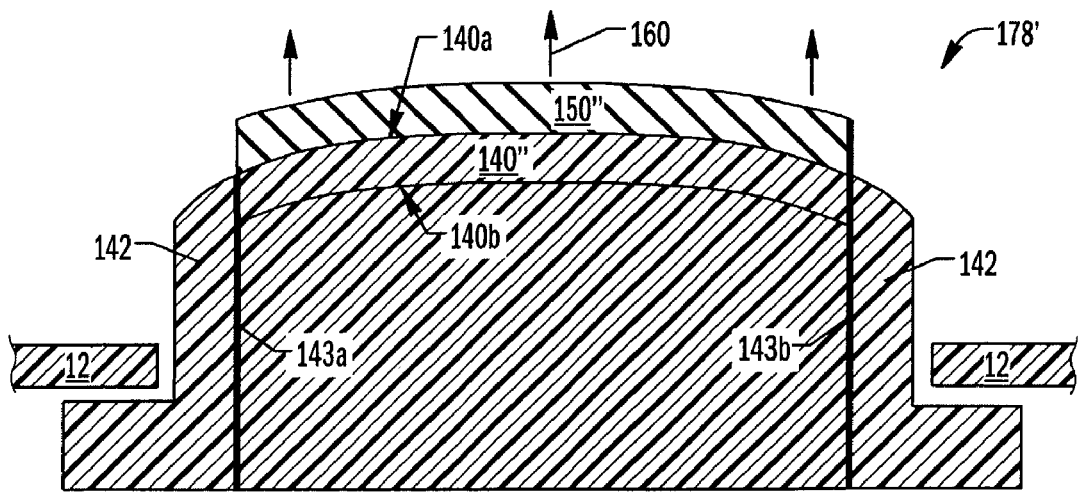

The embodiments of FIGS. 3A-6B illustrated planar faces 140 and planar polymer light emitting devices 150. However, in other embodiments, they need not be planar. Thus, FIGS. 7A and 7B illustrate keys 178 and 178', respectively, wherein a nonplanar face 140" and a nonplanar conformal polymer light emitting device 150" is provided. It will be understood that nonplanar elements of FIGS. 7A and 7B may be used in any of the embodiments of FIGS. 3A-6B, as well.

Embodiments of the present invention use polymer light emitting devices instead of, or in addition to, conventional semiconductor light emitting devices to illuminate keys of a keypad. A polymer light emitting device may be made as a foil or thin film, and can provide an area of light that is comparable to conventional semiconductor light emitting diodes that give a spot of light. Multiple colors are possible using polymer light emitting devices. Thus, multiple colors may be used in a single key, or various keys of the keypad may have different colors, using techniques well known to those having skill in the art. Polymer LEDs may be made nonplanar and/or flexible for use with nonplanar and/or planar key faces of fixed and/or movable keys. Moreover, polymer light emitting devices may have a lower viewing angle dependence compared to conventional semiconductor light emitting diodes, which may be advantageous in a wireless terminal which may be viewed at many different angles. Polymer light emitting devices also may be cheaper than conventional semiconductor light emitting diodes.

According to some embodiments of the invention, a polymer light emitting device is molded on the face (inner surface and/or outer surface) of each key in the keypad. This can provide a lighted area on the face of the key. The text and symbols may be milled or otherwise formed in the coating of the key and/or can be printed on the key. In other embodiments, the symbols may be defined by the pattern of the polymer LED itself. The electrical connections to the polymer light emitting devices can comprise electrically conductive polymers that can be molded on and/or in the key walls and connected to a printed circuit board of the device using conventional techniques.

When used in a wireless terminal, more evenly distributed light may be produced for each key compared to the use of a conventional lightguide. Moreover, reduced or no light leaking from the gap between the keys and the housing may be provided compared to conventional lightguides. The keys also may be made thinner, which can directly impact the thickness of the wireless terminal. Power consumption also can be lower because the polymer light emitting device may only emit light in a desired direction, so that reduced power may be used.

It also will be understood that although embodiments of the invention have been discussed primarily with respect to keypads and keys, other embodiments of the present invention may be used with user input devices other than a key. These user input devices include a jog dial, joystick, jog ball, coin key or the like. These user input devices include a face including an outer surface that is configured for user activation and an inner surface opposite the outer surface. According to some embodiments of the invention, and a polymer light emitting device is provided on at least one of the inner surface and the outer surface, pursuant to any of the embodiments that were described above.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless terminal comprising:
   a housing;
   a plurality of electronic components in the housing that are configured to transmit and/or receive wireless communications;
   a keypad at least partially in the housing, comprising at least one key that comprises:
   at least one wall including first and second opposing ends;
   a nonplanar face that extends from the first end and including an outer surface facing away from the second end that is configured for user activation and an inner surface opposite the outer surface and facing toward the second end; and
   a nonplanar polymer light emitting layer on the outer surface, opposite the inner surface.

2. A wireless terminal according to claim 1 wherein the nonplanar polymer light emitting layer is an unpatterned nonplanar polymer light emitting layer.

3. A wireless terminal according to claim 2 wherein at least one of the outer surface and the inner surface is patterned to form a symbol.

4. A wireless terminal according to claim 3 wherein at least one of the outer surface and the inner surface includes an opening therein which forms the symbol.

5. A wireless terminal according to claim 2 wherein at least one of the outer surface and the inner surface includes a patterned layer thereon which forms the symbol.

6. A wireless terminal according to claim 1 wherein the nonplanar polymer light emitting layer is patterned to form a symbol.

7. A wireless terminal according to claim 1 further comprising a coating on the nonplanar polymer light emitting layer opposite the outer surface.

8. A wireless terminal according to claim 1 wherein the at least one wall extends from the inner surface to within the housing and wherein the wireless terminal further comprises first and second electrodes that are electrically connected to the nonplanar polymer light emitting layer and extend along the at least one wall.

9. A wireless terminal according to claim 1 wherein the at least one key comprises a first key and a second key, wherein the nonplanar polymer light emitting layer on the first key is configured to emit light of a first color and wherein the nonplanar polymer light emitting layer on the second key is configured to emit light of a second color that is different from the first color.

10. A wireless terminal according to claim 1 wherein the at least one key is movable toward and away from the housing.

11. An electronic device comprising:
    a housing;
    a plurality of electronic components in the housing;
    a keypad at least partially in the housing, comprising at least one key that includes a nonplanar face; and
    a nonplanar polymer light emitting layer on the at least one key that is conformal to the nonplanar face;
    wherein the at least one key comprises a first key and a second key, wherein the nonplanar polymer light emitting layer on the first key is configured to emit light of a first color and wherein the nonplanar polymer light emitting layer on the second key is configured to emit light of a second color that is different from the first color.

12. An electronic device according to claim 11 wherein the at least one key comprises:
    a nonplanar face including an outer surface that is configured for user activation and an inner surface opposite the outer surface;
    wherein the nonplanar polymer light emitting layer is on the inner surface, opposite the outer surface.

13. An electronic device according to claim 12 wherein the at least one key includes at least one wall that extends from the inner surface to within the housing and wherein the wireless terminal further comprises first and second electrodes that are electrically connected to the nonplanar polymer light emitting layer and extend along the at least one wall.

14. An electronic device according to claim 11 wherein the at least one key comprises:
a nonplanar face including an outer surface that is configured for user activation and an inner surface opposite the outer surface;
wherein the nonplanar polymer light emitting layer is on the outer surface, opposite the inner surface.

15. An electronic device according to claim 14 further comprising a coating on the nonplanar polymer light emitting layer opposite the outer surface.

16. An electronic device according to claim 11 wherein the nonplanar polymer light emitting layer is an unpatterned nonplanar polymer light emitting layer.

17. An electronic device according to claim 16 wherein the at least one key comprises:
a nonplanar face including an outer surface that is configured for user activation and an inner surface opposite the outer surface;
wherein at least one of the outer surface and the inner surface is patterned to form a symbol.

18. An electronic device according to claim 17 wherein at least one of the outer surface and the inner surface includes an opening therein which forms the symbol.

19. An electronic device according to claim 16 wherein the at least one key comprises:
a nonplanar face including an outer surface that is configured for user activation and an inner surface opposite the outer surface;
wherein at least one of the outer surface and the inner surface includes a patterned layer thereon which forms the symbol.

20. An electronic device according to claim 11 wherein the nonplanar polymer light emitting layer is patterned to form a symbol.

21. An electronic device according to claim 11 wherein the at least one key is movable toward and away from the housing.

22. A keypad for an electronic device comprising:
at least one key including a nonplanar face; and
a nonplanar polymer light emitting layer on the at least one key that is conformal to the nonplanar face;
wherein the at least one key comprises a first key and a second key, wherein the nonplanar polymer light emitting layer on the first key is configured to emit light of a first color and wherein the nonplanar polymer light emitting layer on the second key is configured to emit light of a second color that is different from the first color.

23. A keypad according to claim 22 wherein the at least one key comprises:
a nonplanar face including an outer surface that is configured for user activation and an inner surface opposite the outer surface;
wherein the nonplanar polymer light emitting layer is on the inner surface, opposite the outer surface.

24. A keypad according to claim 23 wherein the at least one key includes at least one wall that extends from the inner surface and wherein the wireless terminal further comprises first and second electrodes that are electrically connected to the nonplanar polymer light emitting layer and extend along the at least one wall.

25. A keypad according to claim 22 wherein the at least one key comprises:
a nonplanar face including an outer surface that is configured for user activation and an inner surface opposite the outer surface;
wherein the nonplanar polymer light emitting layer is on the outer surface, opposite the inner surface.

26. A keypad according to claim 25 further comprising a coating on the nonplanar polymer light emitting layer opposite the outer surface.

27. A keypad according to claim 22 wherein the nonplanar polymer light emitting layer is an unpatterned nonplanar polymer light emitting layer.

28. A keypad according to claim 27 wherein the at least one key comprises:
a nonplanar face including an outer surface that is configured for user activation and an inner surface opposite the outer surface;
wherein at least one of the outer surface and the inner surface is patterned to form a symbol.

29. A keypad according to claim 28 wherein at least one of the outer surface and the inner surface includes an opening therein which forms the symbol.

30. A keypad according to claim 27 wherein the at least one key comprises:
a nonplanar face including an outer surface that is configured for user activation and an inner surface opposite the outer surface;
wherein at least one of the outer surface and the inner surface includes a patterned layer thereon which forms the symbol.

31. A keypad according to claim 22 wherein the nonplanar polymer light emitting layer is patterned to form a symbol.

32. A key for an electronic device comprising:
at least one wall including first and second opposing ends;
a nonplanar face that extends from the first end and including an outer surface facing away from the second end that is configured for user activation and an inner surface opposite the outer surface and facing toward the second end; and
a nonplanar polymer light emitting layer on the outer surface opposite the inner surface and that is conformal to the nonplanar face.

33. A key according to claim 32 wherein the nonplanar polymer light emitting layer is an unpatterned nonplanar polymer light emitting layer.

34. A key according to claim 33 wherein at least one of the outer surface and the inner surface is patterned to form a symbol.

35. A key according to claim 34 wherein at least one of the outer surface and the inner surface includes an opening therein which forms the symbol.

36. A key according to claim 33 wherein at least one of the outer surface and the inner surface includes a patterned layer thereon which forms the symbol.

37. A key according to claim 32 wherein the nonplanar polymer light emitting layer is patterned to form a symbol.

38. A key according to claim 32 further comprising a coating on the nonplanar polymer light emitting layer opposite the outer surface.

39. A key according to claim 32 further comprising:
first and second electrodes that are electrically connected to the nonplanar polymer light emitting layer and extend along the at least one wall.

40. A key according to claim 32 wherein the nonplanar polymer light emitting layer is configured to emit light of a first color and to emit light of a second color that is different from the first color.

41. A user input device for an electronic device comprising:

at least one wall including first and second opposing ends;

a nonplanar face that extends from the first end and including an outer surface facing away from the second end that is configured for user activation and an inner surface opposite the outer surface and facing toward the second end; and a nonplanar polymer light emitting layer on the outer surface opposite the inner surface and that is conformal to the nonplanar face;

wherein the nonplanar polymer light emitting layer is configured to emit light of a first color and to emit light of a second color that is different from the first color.

42. A user input device according to claim 41 wherein the nonplanar polymer light emitting layer is an unpatterned nonplanar polymer light emitting layer.

43. A user input device according to claim 42 wherein at least one of the outer surface and the inner surface is patterned to form a symbol.

44. A user input device according to claim 43 wherein at least one of the outer surface and the inner surface includes an opening therein which forms the symbol.

45. A user input device according to claim 42 wherein at least one of the outer surface and the inner surface includes a patterned layer thereon which forms the symbol.

46. A user input device according to claim 41 wherein the nonplanar polymer light emitting layer is patterned to form a symbol.

47. A user input device according to claim 41 further comprising a coating on the nonplanar polymer light emitting layer opposite the outer surface.

48. A user input device according to claim 41 wherein the user input device comprises a jog dial, jog ball, joystick or coin key.

* * * * *